(12) United States Patent
Yu et al.

(10) Patent No.: US 12,361,322 B2
(45) Date of Patent: Jul. 15, 2025

(54) DEVICE AND METHOD FOR TRAINING A GAUSSIAN PROCESS STATE SPACE MODEL

(71) Applicant: Robert Bosch GmbH, Stuttgart (DE)

(72) Inventors: Hon Sum Alec Yu, London (GB); Dingling Yao, Rottenburg am Neckar (DE); Christoph Zimmer, Korntal (DE); The Duy Nguyen-Tuong, Calw (DE)

(73) Assignee: ROBERT BOSCH GMBH, Stuttgart (DE)

( * ) Notice: Subject to any disclaimer, the term of this patent is extended or adjusted under 35 U.S.C. 154(b) by 819 days.

(21) Appl. No.: 17/648,069

(22) Filed: Jan. 14, 2022

(65) Prior Publication Data

US 2022/0245521 A1    Aug. 4, 2022

(30) Foreign Application Priority Data

Jan. 22, 2021   (DE) .................... 10 2021 200 569.1

(51) Int. Cl.
*G06N 20/00* (2019.01)
*B25J 9/16* (2006.01)
*G06N 5/04* (2023.01)

(52) U.S. Cl.
CPC .............. *G06N 20/00* (2019.01); *B25J 9/163* (2013.01); *G06N 5/04* (2013.01)

(58) Field of Classification Search
CPC .......... G06N 20/00; G06N 5/04; G06N 20/10; B25J 9/163; B25J 9/1605; B25J 9/161;
(Continued)

(56) References Cited

U.S. PATENT DOCUMENTS

| | | | |
|---|---|---|---|
| 2013/0179380 A1* | 7/2013 | Kojaku | G06F 17/18 706/46 |
| 2020/0086483 A1 | 3/2020 | Li et al. | |

(Continued)

FOREIGN PATENT DOCUMENTS

| | | | | |
|---|---|---|---|---|
| CN | 112318509 B | * | 4/2022 | ............ B25J 9/1612 |
| DE | 102010021607 A1 | | 1/2011 | |

(Continued)

OTHER PUBLICATIONS

Delgado-Guerrero et al., "Sample-Efficient Robot Motion Learning using Gaussian Process Latent Variable Models", 2020, IEEE International Conference on Robotics and Automation (Year: 2020).*

(Continued)

*Primary Examiner* — Abby Y Lin
*Assistant Examiner* — Esvinder Singh
(74) *Attorney, Agent, or Firm* — NORTON ROSE FULBRIGHT US LLP (57) ABSTRACT

Training a Gaussian process state space model, which describes a correlation between selected control parameters of a plurality of control parameters for controlling a robotic device and output variables of the robotic device assigned in each case. The method includes: for each control parameter: ascertaining a transitional normal distribution and an output variable normal distribution assigned to a respective predicted output state, ascertaining a respective value of a piece of mutual information between the ascertained output variable normal distribution and the ascertained transitional normal distribution; selecting the control parameter having the highest value of the mutual information as the new control parameter; controlling the robotic device using the new control parameter and measuring an output variable of the robotic device assigned to the new control parameter; and training the Gaussian process state space model using (Continued)

the new control parameter and the assigned measured output variable of the robotic device.

11 Claims, 5 Drawing Sheets

(58) Field of Classification Search
CPC . B25J 13/00; B25J 13/08; B25J 9/1602; B25J 9/1628; B25J 9/1653; B25J 9/1664; G05B 13/04; G05B 2219/1185; G05B 2219/13177
See application file for complete search history.

(56) References Cited

U.S. PATENT DOCUMENTS

| | | | |
|---|---|---|---|
| 2020/0230815 | A1 | 7/2020 | Nikovski et al. |
| 2022/0092455 | A1* | 3/2022 | Kojima ................. G06F 16/00 |

FOREIGN PATENT DOCUMENTS

| | | | |
|---|---|---|---|
| DE | 202017106506 | U1 | 4/2018 |
| DE | 102019205651 | B3 | 8/2020 |
| DE | 102020110650 | A1 | 12/2020 |
| EP | 3432271 | A1 | 1/2019 |
| EP | 3747604 | A1 | 12/2020 |
| WO | 2019241680 | A1 | 12/2019 |
| WO | 2021001312 | A1 | 1/2021 |

OTHER PUBLICATIONS

Frigola et al., "Variational Gaussian Process State-Space Models," Advances in Neuronal Information Processing Systems, 2014, pp. 1-9. <https://proceedings.neurips.cc/paper/2014/file/139f0874f2ded2e41b0393c4ac5644f7-Paper.pdf> Downloaded Jan. 13, 2022.

Alongo et al., "Overcoming Mean-Field Approximations in Recurrent Gaussian Process Models," Proceeding of the 36th International Conference on Machine Learning, Long Beach, California, PMLR 97, 2019, pp. 1-10. <http://proceedings.mlr.press/v97/ialongo19a/ialongo19a.pdf> Downloaded Jan. 13, 2022.

Capone et al., "Localized Active Learning of Gaussian Process State Space Models," 2nd Annual Conference on Learning for Dynamics and Control, Proceedings of Machine Learning Research, vol. 120, 2020, pp. 1-10. <http://proceedings.mlr.press/v120/capone20a/capone20a.pdf> Downloaded Jan. 13, 2022.

* cited by examiner

DEVICE AND METHOD FOR TRAINING A GAUSSIAN PROCESS STATE SPACE MODEL

CROSS REFERENCE

The present application claims the benefit under 35 U.S.C. § 119 of German Patent Application No. DE 10 2021 200 569.1 filed on Jan. 22, 2021, which is expressly incorporated herein by reference in its entirety.

FIELD

Various exemplary embodiments relate in general to a device and to a method for training a Gaussian process state space model.

BACKGROUND INFORMATION

Dynamic systems such as, for example, robotic devices, may be used, for example, in manufacturing, in production, in maintenance, in the household, in means of transportation, in medical technology, etc. In this case, a dynamic system may be controlled using a state space model (SSM) such as, for example, a Gaussian process state space model (GPSSM). The SSM or the GPSSM is able to describe a correlation between control parameters and a target variable of the dynamic system. In this case, it may be necessary for the state space model to be learned specifically for the dynamic system. The learning of the state space model may, however, involve a high expenditure of time or a high computational effort. Thus, it may be necessary to reduce the expenditure of time or the computational effort involved in the learning.

The paper "Variational Gaussian Process State-Space Models" by R. Frigola et al., in Advances in neuronal information processing systems, 2014 (referred to below as reference [1]) describes a learning of a Gaussian process state space model.

The paper "Overcoming Mean-Field Approximations in Recurrent Gaussian Process Models" by A. Ialongo et al., in Proceeding of the 36th International Conference on Machine Learning, 2019, (referred to below as reference [2]) describes a variation inference method for learning a Gaussian process state space model.

The paper "Localized active learning of Gaussian process state space models" by A. Capone et al., in Learning for Dynamics and Control, Proceedings of Machine Learning Research, 2020, describes an active learning of a Gaussian process state space model, control trajectories being optimized under the assumption that latent states are measureable.

SUMMARY

The method and the robotic device including the features of example embodiments of the present invention (first example and eighth example embodiments of the present invention) make it possible to learn a Gaussian process state space model for controlling a robotic device with reduced computational effort.

A robotic device may be any type of computer-controlled device such as, for example, a robot, (for example, a manufacturing robot, a maintenance robot, a household robot, a medical robot, for example, a robotic arm, etc.), a vehicle (for example, an autonomous vehicle), a household appliance, a production machine, a personal assistant, an access control system, an aerodynamic system (for example, an aircraft, for example, a drone, for example, a helicopter), etc.

The mutual information may quantify a set of pieces of information, which are obtained via a first variable (for example, the transitions, for example, the transitional normal distribution), by measuring a second variable (for example, the output variables). As described, the measurement of the output variable having the highest value of the mutual information may also provide more pieces of information about the transitions. The method according to the first example therefore makes it possible to learn a GPSSM with a reduced expenditure of time.

The control of the robotic device using the new control parameter may result in a new state of the robotic device. The method may be carried out iteratively for the respectively new state of the robotic device as the present state of the robotic device, the output state predicted for the respective new control parameter being the present input state of the robotic device of the subsequent iteration. The features described in this paragraph in combination with the first example form a second example embodiment of the present invention.

As described, the Gaussian process state space model may be iteratively learned as a result, it being possible for the control parameter in each iteration to be actively selected. Multiple iterations of the training may, for example, increase the accuracy of the Gaussian process state space model.

The transition function is able to map the input state of the robotic device and the control parameter of the plurality of control parameters according to the transitional normal distribution assigned to the control parameter and to the input state onto a predicted intermediate state. The transition function is able to map the predicted intermediate function onto the predicted output state using a state noise. The features described in this paragraph in combination with the first example or the second example form a third example embodiment of the present invention.

In this way, it is possible to take an uncertainty of the robotic device such as, for example, a process noise, into account. This may increase the accuracy of the learned Gaussian process state space model.

Each measured output variable of the robotic device may be assigned a respective transitional normal distribution ascertained with the aid of the transition function and a respective output variable normal distribution ascertained with the aid of the output variable prediction function. The mutual information between the ascertained output variable normal distribution and the ascertained transitional normal distribution of a respective control parameter may be a piece of mutual information between: a shared probability distribution of the output variables, which includes the output variable normal distributions assigned to the measured output variables and the output variable normal distribution ascertained for the respective control parameter; and a shared probability distribution of the transitional normal distributions, which includes the transitional normal distributions assigned to the measured output variables and the transitional normal distribution ascertained for the respective control parameter. The features described in this paragraph in combination with one or with multiple of the first example through the third example form a fourth example embodiment of the present invention.

In the event that weak dependencies are present between the latent states, for example, it is possible to improve the active selection of the control parameter to the extent that an expenditure of time involved in the training is significantly reduced. As described, this mutual information may be referred to as entire mutual information ($I(y_{1:t};f_{1:t})$) of all measured output variables.

The ascertainment of the value of the mutual information between the output variable normal distributions assigned to the measured output variables and to the output variable normal distribution ascertained for the respective control parameter and the transitional normal distributions assigned to the measured output variables as well as the transitional normal distribution ascertained for the respective control parameter may include: for each sample value of a plurality of sample values: for each measured output variable of the robotic device, ascertaining a respective limit value with the aid of a difference of a logarithm of a probability density function assigned to all measured output values and an evidence lower bound ascertained for the respective measured output variable and adding up the limit values ascertained for all measured output values; and ascertaining a mean value of the summed limit values of all sample values of the plurality of sample values as the value of the mutual information. The features described in this paragraph in combination with the fourth example form a fifth example embodiment of the present invention.

The present input state of the robotic device may be a latent state. The feature described in this paragraph in combination with one or with multiple of the first example through the fifth example form a sixth example embodiment of the present invention.

As described, the latent state of the robotic device is not able to be measured. The method makes it possible to train the Gaussian process state space model by actively selecting a control parameter without the present state of the robotic device being able to be measured.

The training of the Gaussian process state space model using the new control parameter and the assigned measured output variable of the robotic device may include a training of the Gaussian process state space model with the aid of a variation inference method using the new control parameter and the assigned measured output variable of the robotic device. The features described in this paragraph in combination with one or with multiple of the first example through the sixth example form a seventh example embodiment of the present invention.

As described, the Gaussian process state space model may be learned with the aid of the variation inference method for a training data set. The training data set may be expanded by the measured output variable and the Gaussian process state space model may be learned with the aid of the variation inference method for the expanded training data set.

A robotic device may be configured to carry out the method according to one or to multiple of the first example through the seventh example. The robotic device including the features described in this paragraph forms an eighth example embodiment of the present invention.

A control model may be configured to control a robotic device. A method for training the control model may include: for each control parameter of a plurality of control parameters for controlling the robotic device, ascertaining a respective output value of a plurality of output values of the robotic device with the aid of a Gaussian process state space model trained according to one or to multiple of the first example through the seventh example; and training the control model using the plurality of control parameters and the ascertained plurality of output variables in such a way that the trained control model outputs a control parameter for a target output variable. The method including the features described in this paragraph forms a ninth example embodiment of the present invention.

A robotic device may include a memory unit and a control unit. The memory unit may be configured to store the control model trained according to the ninth example. The control unit may be configured to control the robotic device according to the trained control model. The robotic device including the features described in this paragraph forms a tenth example embodiment of the present invention.

A computer program product may store program instructions which, when executed by a computer, prompt the computer to carry out a method according to one or to multiple of the first example through the seventh example. The computer program product including the features described in this paragraph forms an eleventh example embodiment of the present invention.

A non-volatile memory medium may store program instructions which, if they are executed, carry out the method according to one or to multiple of the first example through the seventh example. The non-volatile memory medium including the features described in this paragraph forms a twelfth example embodiment of the present invention.

A non-volatile memory medium may store program instructions which, if they are executed, carry out the method according to one or to multiple of the first example through the seventh example. The non-volatile memory medium including the features described in this paragraph forms a thirteenth example embodiment of the present invention.

A computer program may include instructions which, when they are executed by a computer, prompt the computer to carry out a method according to one or to multiple of the first example through the seventh example. The computer program including the features described in this paragraph forms a fourteenth example embodiment of the present invention.

A computer-readable medium may store instructions which, when they are executed by a computer, prompt the computer to carry out a method according to one or to multiple of the first example through the seventh example. The computer-readable medium including the features described in this paragraph forms a fifteenth example embodiment of the present invention.

BRIEF DESCRIPTION OF THE DRAWINGS

Exemplary embodiments of the present invention are represented in the figures and explained in greater detail in the following description.

DETAILED DESCRIPTION OF EXAMPLE EMBODIMENTS

Robotic devices may be controlled with the aid of robotic control models, which use a Gaussian process state space model (GPSSM) that is specifically trained for the respective robotic device and that describes a correlation between control parameters of the robotic device and target variables of the robotic device. The learning of the GPSSM may, however, involve a high expenditure of time or a high computational effort. Various exemplary embodiments of the present invention relate to a device and to a method for training a GPSSM, in which control parameters are actively selected during the learning, so that the expenditure of time and/or the computational effort involved in the learning of the GPSSM of a robotic device is/are reduced.

Figure 1:
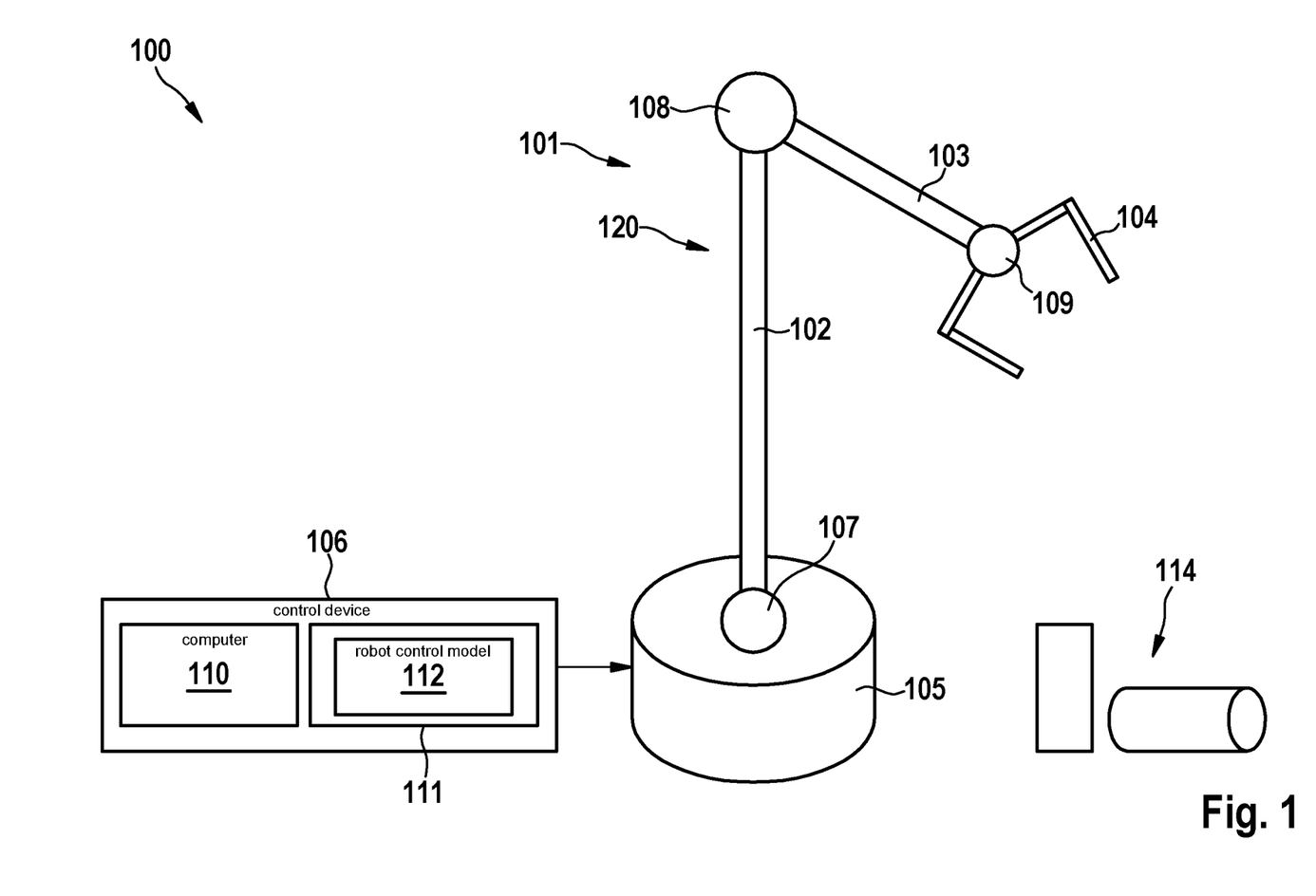
FIG. 1 shows an exemplary robotic device system according to various specific embodiments of the present invention.

FIG. 1 shows a robotic device system 100. Robotic device system 100 may include a robotic device 101. Robotic device 101 shown in FIG. 1 and described by way of example below represents for the purpose of illustration an exemplary robotic device and may, for example, include an industrial robot in the form of a robotic arm for moving, mounting or machining a workpiece. It is noted that the robotic device may be any type of computer-controlled device such as, for example, a robot (for example, a manufacturing robot, a maintenance robot, a household robot, a medical robot, etc.), a vehicle (for example, an autonomous vehicle), a household appliance, a production machine, a personal assistant, an access control system, etc.

In one specific embodiment, a "computer" may be understood to mean any type of logic-implementing entity, which may be hardware, software, firmware or a combination thereof. Thus, in one specific embodiment, a "computer" may be a hardwired logic circuit or a programmable logic circuit such as, for example, a programmable processor, for example, a microprocessor (for example, a CISC (processor having a large instruction set) or a RISC (processor having a reduced instruction set). A "computer" may include one or multiple processors. A "computer" may also be software, which is implemented or executed by a processor, for example, any type of computer program, for example, a computer program that uses a virtual machine code such as, for example, Java. Any other type of implementation of the respective functions, which are described in greater detail below, may be understood to be a "computer" in accordance with an alternative specific embodiment.

Robotic device 101 includes robot members 102, 103, 104 and a base (or generally a holder) 105, by which robot members 102, 103, 104 are supported. The term "robotic member" refers to the movable parts of robotic device 101, whose actuation allows for a physical interaction with the surroundings, for example, in order to execute a task, for example, in order to execute or carry out one or multiple skills.

For controlling, robotic device system 100 includes a control device 106, which is configured to implement the interaction with the surroundings according to a control program. Final element 104 (as viewed from base 105) of robotic members 102, 103, 104 is also referred to as end effector 104 and may contain one or multiple tools.

Other robot members 102, 103 (closer to base 105) may form a positioning device, so that together with end effector 104, a robotic arm 120 (or articulated arm) may be provided with end effector 104 at its end. Robotic arm 120 is a mechanical arm, which is able to fulfill functions similarly to a human arm (potentially with a tool at its end).

Robotic device 101 may include connection elements 107, 108, 109, which connect robot members 102, 103, 104 to one another and to base 105. A connection element 107, 108, 109 may include one or multiple joints, each of which is able to provide a rotational movement and/or a translational movement (i.e., a displacement) for associated robot members relative to one another. The movement of robot members 102, 103, 104 may be initiated with the aid of actuators that are controlled by control device 106.

The term "actuator" may be understood to mean a component, which is suitable, in response to being driven, for influencing a mechanism. The actuator is able to convert instructions output by control device 106 (the so-called activation) into mechanical movements. The actuator, for example, an electromechanical converter, may be configured to convert electrical energy into mechanical energy in response to its activation.

The term "control device" (also referred to as "control unit") may be understood to mean any type of logical implementation unit, which may, for example include a circuit and/or a processor, which is able to execute software, firmware or a combination of the same stored in a memory medium, and is able to issue the instructions, for example, to an actuator in the present example. The control device may, for example, be configured to control the operation of a system, in the present example, of a robot, by using program code (for example, software).

In the present example, control device 106 includes a computer 110 and a memory 111, which stores code and data, on the basis of which computer 110 controls robotic device 101. According to various specific embodiments, control device 106 controls robotic device 101 on the basis of a robot control model 112 stored in memory 111.

According to various specific embodiments, robotic device 101 (for example, robotic arm 120) may be configured to pick one or multiple objects 114. According to various specific embodiments, robotic device 101 (for example, robotic arm 120) may be configured to move a picked object.

According to various specific embodiments, robotic device system 100 may include one or multiple sensors. The one or multiple sensors may be configured to provide sensor data, which characterize a state of the robotic device. For example, the one or multiple sensors may include an imaging sensor such as, for example, a camera (for example, a standard camera, a digital camera, an infrared camera, a stereo camera, a depth camera, etc.), a radar sensor, a LIDAR sensor, a position sensor, a speed sensor, an ultrasonic sensor, an acceleration sensor, a pressure sensor, etc.

Robotic device 101 may be in one state of a plurality of states. According to various specific embodiments, robotic device 101 may be in one present state of the plurality of states at any point in time. According to various specific embodiments, pieces of information relating to the respective state of robotic device 101 may be ascertained with the aid of sensor data provided by the one or multiple sensors.

Robotic device 101 may be configured, to execute a plurality of skills. The skills of the plurality of skills may, for example, be predefined in the program code of control device 106. One or multiple skills of the plurality of skills may, for example, include a mechanical movement of one or of multiple robot members 102, 103, 104. One or multiple skills of the plurality of skills may, for example, include an action of the end effector (for example, a gripping, for example, a releasing, etc.). According to various specific embodiments, robotic device 101 may be controlled for executing a skill using one or multiple control parameters of a plurality of control parameters for controlling robotic device 101. According to various specific embodiments, a controlling of robotic device 101 carried out in a present state of robotic device 101 using one or multiple control parameters of the plurality of control parameters may result in a resulting state of the plurality of states of robotic device 101. A control parameter may, for example, be a voltage value to be applied.

According to various specific embodiments, the states of robotic device 101 may be latent states. As described, it may not be possible to ascertain a respective present state of robotic device 101.

According to various specific embodiments, robot control model 112 may use a trained Gaussian process state space model (GPSSM).

The trained GPSSM is able, for example, to describe a correlation between control parameters of a plurality of control parameters of robotic device 101 and one or multiple target variables of robotic device 101. According to various specific embodiments, the GPSSM may be learned specifically for robotic device 101.

According to various specific embodiments, a part of robot control model 112 may be generated (for example, learned, for example, trained), while robotic device 101 is not in operation. According to various specific embodiments, the trained GPSSM may be used during the operation of robotic device 101 in order to ascertain control parameters for controlling robotic device 101 with respect to a desired value of a target variable. According to various specific embodiments, the trained GPSSM may be additionally trained during the operation of robotic device 101. According to various specific embodiments, a value of the target variable may be measured. For example, the one or multiple sensors may be configured to measure the target variable. For example, the one or multiple sensors may be configured to detect data and computer 110 may be configured to ascertain the target value using the data.

Robotic device 101 may be in a present state, $x_t$, at any point in time. According to various specific embodiments, present state, $x_t$, may be an unmeasurable latent state. According to various specific embodiments, the target variable is able to be measured. For the purpose of illustration, robotic device system 100 may, for example, include or be a coating system, which is in a latent state, whereby the target variable may be a layer thickness, for example, which may be measured (for example, optically, for example with the aid of weighing, for example, with the aid of particle streams, etc.). For example, robotic device system 100 may include or be a flying object, which is in a latent state, whereby the target variable may be a flight altitude, for example, which is able to be measured. For example, robotic device system 100 may include a robotic arm, which is in a latent state, where the target variable may be a position of the robotic arm, for example, which is able to be measured.

Figure 2:
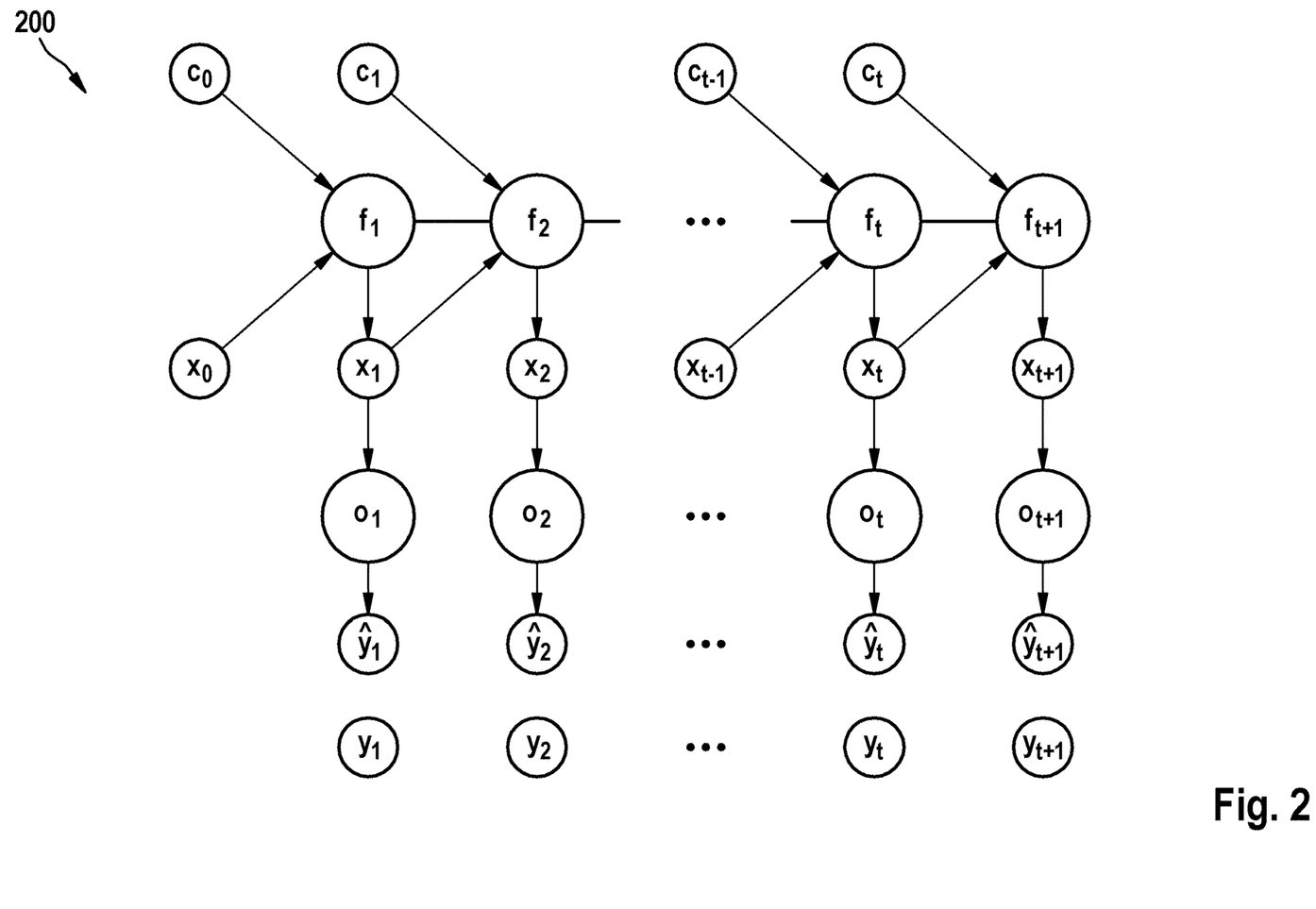
FIG. 2 shows a graphic illustration of a Gaussian process state space model according to various specific embodiments of the present invention.

FIG. 2 shows a graphic illustration of a GPSSM 200 of a robotic device such as, for example, robotic device 101, according to various specific embodiments. GPSSM 200 may, for example, be used as robot control model 112 and/or as a part of control model 112. GPSSM 200 is described by way of example below with reference to robotic device 101.

GPSSM 200 is able to describe for a point in time, t, of a discrete time sequence of t=1 through t=T (where T≥1) a correlation between a control parameter, $c_{t-1}$, of previous point in time, t−1, and an output variable, $y_t$, measured at respective point in time, t. Robotic device 101 may be in a present state, $x_t$, at any point in time, t. According to various specific embodiments, present state, $x_t$, may be a latent state. For example, latent state, $x_t$, may be a latent variable. As described, latent state, $x_t$, of robotic device 101 is not able to be measured. For example, GPSSM 200 at a point in time t=1 may be in latent state, $x_1$, and a controlling of robotic device 101 using a control parameter, $c_1$, may result in a new state, $x_2$, of robotic device 101. According to various specific embodiments, an output variable, $y_2$, may be measured in new state, $x_2$, of robotic device 101.

Output variables, y, measured for respective points in time, t, of the discrete time sequence of t=1 through T=1 (in some aspects also referred to as observations) may be described by $y_{1:T} \equiv \{y_t\}_{t=1}^T$. Each output variable $y_t \in \mathcal{Y} \subseteq \mathbb{R}^{d_y}$ may result from an assigned latent state $x_t \in \mathcal{X} \subseteq \mathbb{R}^{d_x}$ and a control parameter $c_{t-1} \in \mathcal{C} \subseteq \mathbb{R}^{d_c}$ assigned to previous point in time, t−1.

As described, GPSSM 200 may include for discrete time sequence t=1−T measured output variables $y_{1:T} \equiv \{y_t\}_{t=1}^T$, latent states $x_{0:T} \equiv \{x_t\}_{t=0}^T$ and control parameters $c_{0:T} \equiv \{c_t\}_{t=0}^T$. According to various specific embodiments, the latent states may satisfy the Markov property. GPSSM 200 is able to describe a correlation between selected control parameters $c_{0:T} \equiv \{c_t\}_{t=0}^T$ of a plurality of control parameters for controlling robotic device 101 and assigned measured output variables $y_{1:T} \equiv \{y_t\}_{t=1}^T$ of robotic device 101 in each case.

According to various specific embodiments, GPSSM 200 may include a transition function, f. Transition function, f, is able to map for a point in time, t, an input state, $x_{t-1}$, of robotic device 101 and a control parameter, $c_{t-1}$, of the plurality of control parameters for controlling robotic device 101 according to a transitional normal distribution assigned to control parameter, $c_{t-1}$, and to input state, $x_{t-1}$, onto a predicted output state, $x_t$. The mapping of transition function, f, may be described by $f: \mathbb{R}^{d_x} \times \mathbb{R}^{d_c} \to \mathbb{R}^{d_x}$.

According to various specific embodiments, GPSSM 200 may be defined as a probabilistic state space model with a Gaussian process GP a priori to transition function, f. Transition function, f, may be described with the aid of equation (1):

$$f \sim \mathcal{GP}(m(\cdot), k(\cdot, \cdot)), \quad (1)$$

where m(•) is a mean value function and k(•,•) is a positive definite covariance function.

According to various specific embodiments, initial state, x0, may be described with the aid of equation (2):

$$x_0 \sim p(x_0). \quad (2)$$

Initial state $p(x_0) = \mathcal{N}(x_0|\mu_0, \Sigma_0)$ may be assumed to be known. Transition function $f_t = f(x_{t-1}, c_{t-1})$ is able to map input state $x_{t-1}$ and control parameter $c_{t-1}$ according to a transitional normal distribution assigned to input state $x_{t-1}$ and to control parameter $c_{t-1}$ onto predicted output state, $x_t$. According to various specific embodiments, transition function $f_t = f(x_{t-1}, c_{t-1})$ is able to map input state $x_{t-1}$ and control parameter $c_{t-1}$ according to the transitional normal distribution assigned to input state $x_{t-1}$ and to control parameter $c_{t-1}$ onto a predicted intermediate state and is able to map the predicted intermediate state onto predicted output state, $x_t$, using a state noise, Q. State noise Q may, for example, be a process noise. Predicted output state, $x_t$, may be described with the aid of equation (3):

$$x_t | f(x_{t-1}, c_{t-1}) \sim \mathcal{N}(x_t | f(x_{t-1}, c_{t-1}), Q), \quad (3)$$

it following from $f_t = f(x_{t-1}, c_{t-1})$ that $x_t|f_t \sim \mathcal{N}(x_t|f_t, Q)$. According to various specific embodiments, GPSSM 200 may include an output variable prediction function, o [sic; $o_t$]. Output variable prediction function, $o_t$, is able to map predicted output state, $x_t$ according to an output variable normal distribution assigned to output state, $x_t$, onto an output variable, $\hat{y}_t$, of robotic device 101. According to various specific embodiments, output variable prediction function, $o_t$, of GPSSM 200 learned for discrete time sequence t=1–T is able to map a respective output state $x_{0:T} \equiv \{x_t\}_{t=0}^T$ onto output variable $y_{1:T} \equiv \{y_t\}_{t=1}^T$ measured in each case. As described, transition function, f, as well as output variable prediction function, o [sic; $o_t$], may include a respective normal distribution (in some aspects also referred to as a Gaussian distribution).

Output variable prediction function, $o_t$, may be described with the aid of equation (4):

$$y_t|x_t \sim \mathcal{N})(y_t|Cx_t + d, R), \qquad (4)$$

R being an observation noise (for example, a measuring noise) and C and d being parameters of a linear mapping.

For the purpose of simplification $\tilde{x}_* = (x_*, c_*)$ may be used, where * may indicate a respective index or a series of indices.

According to various specific embodiments, the matrix of the covariance functions may be described by $K_{i;j} \equiv (k(\tilde{x}_s, \tilde{x}_t))_{s,t=i}^j$. In various aspects, it may be that $(k(\tilde{x}_{i;j}, \tilde{x}_k) \equiv (k(\tilde{x}_i, \tilde{x}_k), \ldots, k(\tilde{x}_j, \tilde{x}_k))$ and $k(\tilde{x}_{i;j}, \tilde{x}_k)^T = k(\tilde{x}_k, \tilde{x}_{i;j})$ may apply.

As described, transition function, f, of GPSSM 200 learned for discrete time sequence t=1–T may be described by $f_{1:T} \equiv \{f_t\}_{t=1}^T$. Shared probability density function (shared PDF) $p(y_{1:T}, x_{0:T}, f_{1:T})$ may be described with the aid of equation (5):

$$p(y_{1:T}, x_{0:T}, f_{1:T}) = p(x_0) \prod_{t=1}^T p(y_t|x_t) p(x_t|f_t) p(f_t|x_{0:t-1}, f_{1:t-1}). \qquad (5)$$

Further details in this regard are described in reference [1]. Term $p(f_t|x_{0:t-1}, f_{1:t-1})$ from equation (5) may be described according to equation (6) using equation (1):

$$p(f_t|x_{0:t-1}, f_{1:t-1}) = \mathcal{N}(f_t|\mathcal{M}_{t-1}, \mathcal{K}_{t-1}) \qquad (6)$$

where $$\mathcal{M}_{t-1} = m(\tilde{x}_{t-1}) +$$
$$k(\tilde{x}_{t-1}, \tilde{x}_{0:t-2}) K_{0:t-2}^{-1} (f_{1:t-1} - m(\tilde{x}_{0:t-2}))^T,$$
$$\mathcal{K}_{t-1} = k(\tilde{x}_{t-1}, \tilde{x}_{t-1}) -$$
$$k(\tilde{x}_{t-1}, \tilde{x}_{0:t-2}) K_{0:t-2}^{-1} k(\tilde{x}_{0:t-2}, \tilde{x}_{t-1}),$$

and where term $f_{1:T-1} - m(\tilde{x}_{0:t-2})$ may be described as $$f_{1:t-1} - m(\tilde{x}_{0:t-2}) \equiv (f_1 - m(\tilde{x}_0), \ldots, f_{t-1} - m(\tilde{x}_{t-2})).$$

Each measured output variable $y_{1:T} \equiv \{y_t\}_{t=1}^T$ may be assigned a predicted output state $x_{0:T} \equiv \{x_t\}_{t=0}^T$. Respective predicted output state, $x_t$, may be ascertained using transition function, $f_t$. GPSSM 200 may be ascertained using measured output variables $y_{1:T} \equiv \{y_t\}_{t=1}^T$, predicted output states $x_{0:T} \equiv \{x_t\}_{t=0}^T$ and transitional normal distributions $f_{1:T} \equiv \{f_t\}_{t=1}^T$. According to various specific embodiments, GPSSM 200 may be trained using a variation inference method. In the variation inference method, an evidence lower bound, ELBO may be ascertained. The variation inference method is computationally efficient, for example. Furthermore, predications may be ascertained with the aid of the variation inference method, which may be used in an active learning of a GPSSM such as, for example, of GPSSM 200.

A learning of GPSSM 200 is described by way of example below for a variation inference method. It is noted that GPSSM 200 may also be learned with the aid of other methods for learning Gaussian process state space models.

Output variable prediction function, $o_t$, is able to map predicted output state, $x_t$, according to an output variable normal distribution assigned to output state, $x_t$, onto an output variable, $\hat{y}_t$, of robotic device 101. Output variable prediction function, $o_t$, of GPSSM 200 may be learned in such a way that this function maps predicted output state, $x_t$ according to output variable normal distribution $p(y_t)$ assigned to output state, $x_t$, onto respective measured output variable, $y_t$. As described, a difference between measured output variable, $y_t$, and a mean value of output variable normal distribution $p(t_t)$ may, for example, be reduced (for example, minimized).

According to various specific embodiments, $p(x_{0:t}, f_{1:t}|y_{1:t}) = p(x_{0:t}, f_{1:t}, y_{1:t}) = p(y_{1:t})$ may be ascertained.

Additional points, u, may be added to shared probability density function $p(y_{1:T}, x_{0:T}, f_{1:T})$ according to equation (5). This may be described with the aid of the shared probability density function according to equation (7):

$$p(y_{1:T}, x_{0:T}, f_{1:T}, u) = p(x_0) p(u) \prod_{t=0}^T p(y_t|x_t) p(x_i|f_i) \qquad (7).$$

$$p(f_t|x_{0:t-1}, f_{1:t-1}, u).$$

Additional points, u, may be described by $u_{1:M} \equiv \{u_i\}_{i=1}^M$, where it may be that M≪T.

Output variable normal distribution $p(y_{1:t})$ may be based on a Kullback-Leibler (KL) divergence. The logarithmic marginal likelihood of output variable normal distribution $p(y_{1:t})$ may be described with the aid of equation (8):

$$\log(p(y_{1:t})) = \mathcal{L}_t - KL[q(x_{0:t}, f_{1:t}) \| p(x_{0:t}, f_{1:t}|y_{1:t})] \text{ for } t = 1, \ldots, T, \qquad (8)$$

where $\mathcal{L}_t$ is the evidence lower bound (ELBO) of the logarithmic marginal likelihood of output variable normal distribution $p(y_{1:t})$.

According to various specific embodiments, ELBO $\mathcal{L}_t$ may be described by $$\mathcal{L}_t = \int q(x_{0:t}, f_{1:t}, u) \log\left(\frac{p(y_{1:t}, x_{0:t}, f_{1:t}, u)}{q(x_{0:t}, f_{1:t}, u)}\right) dx_{0:t} df_{1:t} du. \qquad (9)$$

$q(x_{0:t}, f_{1:t}, u)$ may be described with the aid of equation (10):

$$q(x_{0:t}, f_{1:t}, u) = q(u)q(x_0)\prod_{i=1}^{t} q(x_i | f_i)p(f_i | f_{1:i-1}, x_{0:i-1}, u). \quad (10)$$

Inserting $q(x_{0:t}, f_{1:t}, u)$ according to equation (10) into equation (9) results in equation (11):

$$\mathcal{L}_T = \int \sum_{t=1}^{T} q(x_{0:T})\log(p(y_t | x_t))dx_{0:T} -$$

$$\sum_{t=1}^{T} \int q(f_t)KL[q(x_t | f_t) \| p(x_t | f_t)]df_t - \quad (11)$$

$$KL[q(x_0) \| p(x_0)] - KL[q(u) \| p(u)].$$

The free Gaussian density of additional values, u, may be described as $q(u)=\mathcal{N}(\mu|\mu_u,\Sigma_u)$. According to various specific embodiments, $q(x_i|f_i)$ may be described as $$q(x_i | f_i) = \mathcal{N}\left(x_i \mid A_{i-1}\tilde{f}_{i-1} + b_{i-1}, S_{i-1}\right), \quad (12)$$

where $A_i$, $b_i$ and $S_i$ are free variation parameters.

Further details for learning the GPSSM are described in reference [2].

According to various specific embodiments, $\hat{f}_i=x_i$ may be set. In this way, a stable progress of the accuracy of the GPSSM during the training may be ensured, for example. Furthermore, this may require a reduced number of iterations, as a result of which an expenditure of time involved in the training is reduced. By using $\hat{f}_i=x_i$, the free variation parameters in equation (12) may be described as $$S_{i-1} = (Q^{-1} + C^T R^{-1} C)^{-1},$$

$$A_{i-1} = S_{i-1}Q^{-1} \text{ and}$$

$$b_{i-1} = S_{i-1}C^T R^{-1}(y_t - d).$$

According to various specific embodiments, GPSSM 200 may be learned for present training data $\mathcal{D} \equiv \{y_{1:T}, x_{0:T}, f\}$. Output variable prediction function, $o_t$, of learned GPSSM 200 is able to ascertain an output variable normal distribution p(y) using a respective control parameter $c \in \mathcal{C} \subseteq \mathbb{R}^{d_c}$; and present training data $\mathcal{D} \equiv \{y_{1:T}, x_{0:T}, f\}$. According to various specific embodiments, an output variable normal distribution of an output variable y* predicted for a control parameter c* may be described with the aid of predictive distribution $p(y^*|c^*, \mathcal{D})$ according to equation (13):

$$p(y^* | c^*, \mathcal{D}) = \mathcal{N}(y^*|Cf(x_T, c^*) + d, R + CQC^T). \quad (13)$$

According to various specific embodiments, $f(x_T, c^*)$ may be ascertained using output states $x_{1:T}$ already predicted during the training of GPSSM 200. Further details in this regard are described in reference [2].

Figure 3A:
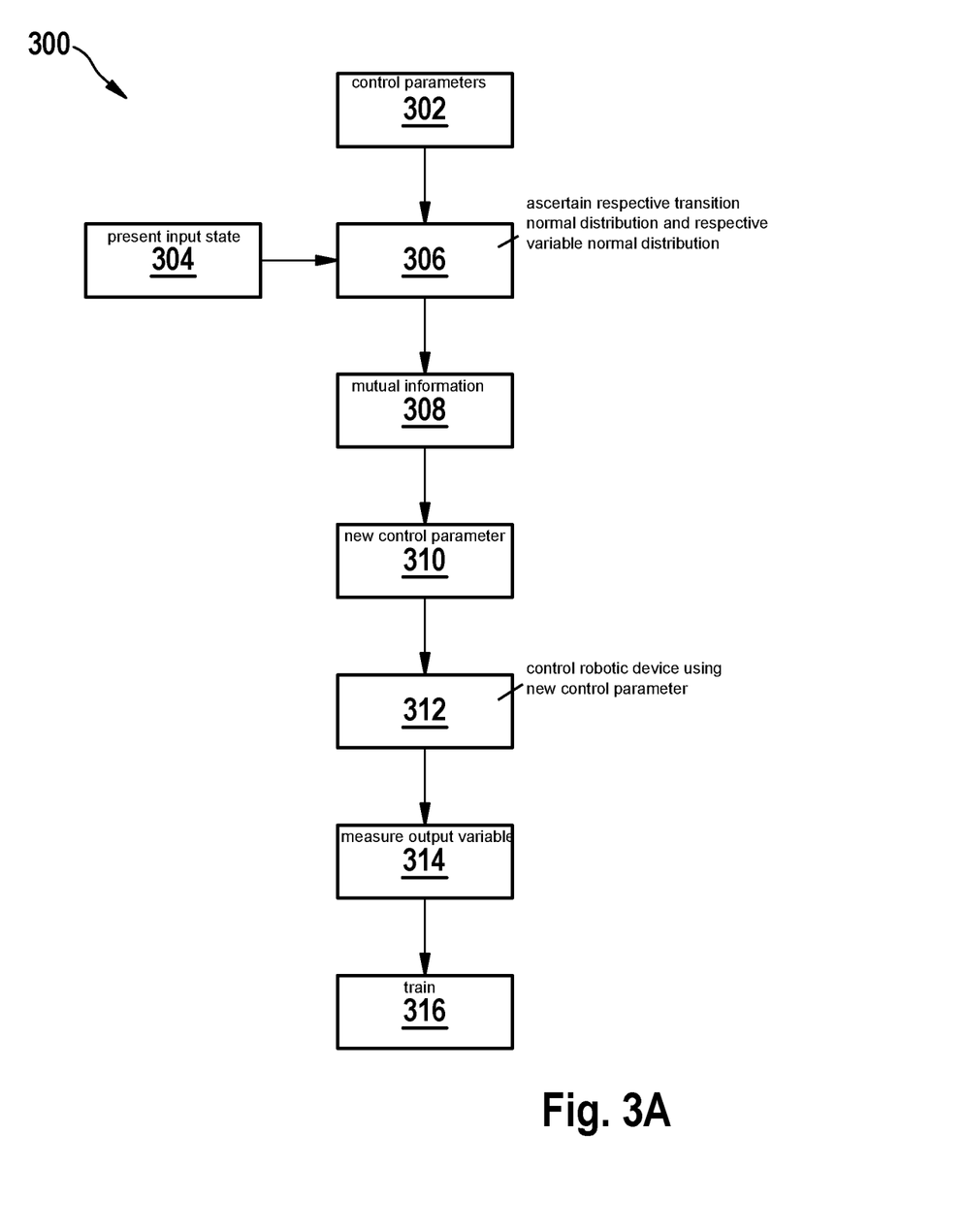
FIGS. 3A and 3B each show a flowchart for training a Gaussian process state space model of a robotic device according to various specific embodiments of the present invention.

FIG. 3A shows a flowchart 300 for training GPSSM 200 of a robotic device such as, for example, robotic device 101, according to various specific embodiments. The training of GPSSM 200 is described by way of example below with reference to robotic device 101.

According to various specific embodiments, GPSSM 200 may be trained with the aid of active learning. During an active learning, a control parameter may be actively selected and the output variable assigned to the selected control parameter may be measured. As described, the amount of present training data $\mathcal{D} \equiv \{y_{1:T}, x_{0:T}, f\}$ may be increased in this way, and GPSSM 200 may be learned for the increased amount of present training data, as described with reference to FIG. 2.

The training of a GPSSM may necessitate a high expenditure of time or a high computational effort. Thus, it may be desirable to select a new control parameter in such a way that the expenditure of time or the computational effort of the training is reduced. As described, the GPSSM is to be learned as rapidly as possible. According to various specific embodiments, a piece of mutual information is used as a criterion for such purpose, as described below in various exemplary embodiments.

Robotic device 101 may be configured to be controlled with the aid of a control parameter, $c_t$, of the plurality of control parameters $c \in \mathcal{C} \subseteq \mathbb{R}^{d_c}$.

Robotic device 101 may be in a present input state 304, $x_t$. Present input state 304, $x_t$, may be predicted with the aid of transition function, f, or may have been predicted during the previous training.

According to various specific embodiments, a respective transitional normal distribution $f_{t+1}$ and a respective output variable normal distribution $\hat{y}_{t+1}$ of the predicted output variable may be ascertained 306 for each control parameter, $c_t$, of the plurality of control parameters $c \in \mathcal{C} \subseteq \mathbb{R}^{d_c}$ 302. For each control parameter, $c_t$, of the plurality of control parameters $c \in \mathcal{C} \subseteq \mathbb{R}^{d_c}$ 302, it is possible to ascertain 306 transitional normal distribution $f_{t+1}$ assigned to respective control parameter, $c_t$, and to present input state 304, and output variable normal distribution $\hat{y}_{t+1}$ of the predicted output variable assigned to respective predicted output variable, $x_{t+1}$. As described, transitional normal distribution $f_{t+1}$ may be a present transitional normal distribution and output variable normal distribution $\hat{y}_{t+1}$ may be a present output variable normal distribution. Output variable normal distribution $\hat{y}_{t+1}$ may be ascertained for a respective control parameter, $c_t$ with the aid of equation (13), $p(y^*..c^*, \mathcal{D})= \mathcal{N}(y^*|Cf(x_T, c^*)+d, R+CQC^T)$. As described, respective control parameter, $c_t$, is the only independent variable in this case.

According to various specific embodiments, a respective value of a piece of mutual information 308 may be ascertained for each control parameter, $c_t$, of the plurality of control parameters $c \in \mathcal{C} \subseteq \mathbb{R}^{d_c}$ 302. In various exemplary embodiments, mutual information 308, I, may be ascertained according to $I(y_{1:t}, \hat{y}_{t+1}, f_{1:t+1})$ (referred to below as present mutual information) either (1) between transition $f_{t+1}$ ascertained for respective control parameter, $c_t$, and ascertained output variables $\hat{y}_{t+1}$, or (2) between (a) a shared probability distribution of all measured output variables as well as present output variable $y_{1:T} \equiv \{y_t\}_{t+1}^T$ ascertained for the respective control parameter and (b) a shared probability distribution of transitions $f_{1:T} \equiv \{f_t\}_{t=1}^T$ assigned to measured output variables as well as to present transition $f_{t+1}$ assigned to the respective control parameter according to $I(\hat{y}_{t+1}; f_{t+1})$ (referred to below as entire mutual information). A piece of mutual information describes in general how different the shared probability distribution of the variable pair is with respect to the product of the marginal distribution of the variables. Since the mutual information refers to probability distributions of the two variables, mutual information 308, I, will be ascertained according to $I(\hat{y}_{t+1};\mathfrak{f}_{t+1})$ (referred to below as present mutual information) below also as mutual information either (1) between transitional normal distribution $\mathfrak{f}_{t+1}$ ascertained for respective control parameter, $c_t$, and ascertained output variable normal distribution $\hat{y}_{t+1}$, or (2) according to $I(y_{1:t},\hat{y}_{t+1};\mathfrak{f}_{1:t+1})$ (referred to below as entire mutual information) between (a) a shared probability distribution of the assigned output variable normal distributions of all measured output variables $y_{1:T} \equiv \{y_t\}_{t=1}^T$ as well as present output variable normal distribution $\hat{y}_{t+1}$ ascertained for the respective control parameter and (b) a shared probability distribution of transitional normal distributions $\mathfrak{f}_{1:T} \equiv \{\mathfrak{f}_t\}_{t=1}^T$ assigned to measured output variables $y_{1:T} \equiv \{y_t\}_{t=1}^T$ as well as present transitional normal distribution $\mathfrak{f}_{t+1}$ ascertained for the respective control parameter.

(1) Present Mutual Information $I(\hat{y}_{t+1};\mathfrak{f}_{t+1})$

According to various specific embodiments, transitional normal distribution $\mathfrak{f}_{t+1}$ may be [assigned to] a respective control parameter, $c_t$, $\mathfrak{f}_{t+1} \equiv f(x_t, c_t)$.

As an example of two random variables x, y, p(y|x) may be described as $p(y|x) = \mathcal{N}(y|\mu(x),\sigma^2(x))$. For a mean value u and variance $\Sigma_x$, $p(x|u,\Sigma_x)$ may be described as $p(x|u,\Sigma_x) = \mathcal{N}(x|u,\Sigma_x)$. In this case, the approximated Gaussian integral may be described according to equation (14):

$$\int p(y|x)p(x|u,\Sigma_x)dx \approx \mathcal{N}(M(u,\Sigma_x), V(u,\Sigma_x)), \quad (14)$$

where $M(u,\Sigma_x)$ and $V(u,\Sigma_x)$ are the integral functions to be ascertained, with $$M(u,\Sigma_x) = \int \mu(x)p(x|u,\Sigma_x)dx, \text{ and}$$

$$V(u,\Sigma_x) = \int \sigma^2(x)p(x|u,\Sigma_x)dx + \int \mu^2(x)p(x|u,\Sigma_x)dx - M(u,\Sigma_x)^2.$$

If $\mu(x)$ is linear (for example, $\mu(x) = Fx+\alpha$) and $\sigma^2(x)$ is represented as matrix A, Gaussian integral may be described with the aid of equation (15) [sic; (14)]:

$$\int \mathcal{N}(y|Fx+a, A)\mathcal{N}(x|u,\Sigma_x)dx = \mathcal{N}(y|a+Fu, A+F\Sigma_x F^T), \quad (14)$$

For a Gaussian process (GP), $M(\cdot,\cdot)$ and $V(\cdot,\cdot)$ may be described with the aid of the expected value of core function k:

$$M(\cdot,\cdot) = \sum_{i=1}^{t} \beta_i E_x[k(x,x_i)], \quad (15)$$

$$V(\cdot,\cdot) = E_x[k(x,x)] - \sum_{i,j=1}^{t} (K_{ij}^{-1} - \beta_i\beta_j)E_x[k(x,x_i)k(x,x_j)] - M(u,\Sigma_x)^2, \quad (16)$$

where $\beta = K^{-1}y$, and $\beta = \{\beta_i\}_{i=1}^t$ and K are the covariance matrix of the Gaussian process.

With respect to equations (15) and (16), the following terms are to be ascertained:

$$l := E_x[k(x,x)],$$
$$l_i := E_x[k(x,x_i)],$$
$$l_{ij} := E_x[k(x,x_i)k(x,x_j)]$$

If the core function has a quadratic exponential form such as, for example, $$k(x_i,x_j) = \sigma^2 \exp\left[-\frac{1}{2}(x_i-x_j)^T \Lambda^{-1}(x_i-x_j),\right],$$

then $k(x_i,x_j)$ may be described as $k(x_i,x_j) = c\mathcal{N}(x_i|x_j,\Lambda)$ where $c = (2\pi)^{d_x/2}|\Lambda|^{1/2}\sigma^2$. In this case, $$l = l = \sigma^2$$
$$l_i = c\mathcal{N}\left(u|x_i, \Lambda + \sum_x\right),$$
$$l_{ij} := c\mathcal{N}\left(x_i|x_j, 2\Lambda\right)\mathcal{N}\left(u|\frac{1}{2}(x_i+x_j), \frac{1}{2}\Lambda + \sum_x\right)$$

may apply.

For the purpose of simplification, present mutual information $I(\hat{y}_{t+1};\mathfrak{f}_{t+1})$ is described below with the aid of $I(y_t;\mathfrak{f}_t)$. Present mutual information $I(y_t;\mathfrak{f}_t)$ may be described with the aid of $I(y_t;\mathfrak{f}_t) = h(y_t) - h(y_t|\mathfrak{f}_t)$, $h(\cdot)$ being the differential entropy. Output variable normal distribution $p(y_t)$ may be described according to equation (17):

$$p(y_t) = \int p(y_t, x_{0:t}, f_{1:t})dx_{0:t}df_{1:t} \quad (17)$$

$$= \int p(y_t|x_{0:t}, f_{1:t})p(x_t|x_{0:t-1}, f_{1:t})p(f_t|x_{0:t-1}, f_{1:t-1})$$
$$p(x_{0:t-1}, f_{1:t-1})dx_{0:t}df_{1:t}$$

$$= \int p(y_t|x_t)p(x_t|f_t)p(f_t|x_{0:t-1}, f_{1:t-1})p(x_{0:t-1}, f_{1:t-1})dx_{0:t}df_{1:t}$$

$$= \int p(y_t|x_t)\prod_{i=1}^{t} p(x_i|f_i)p(f_i|x_{0:i-1}, f_{1:i-1})p(x_0)dx_{0:t}df_{1:t}$$

$$= \int \mathcal{N}(y_t|Cx_t + d, R)\prod_{i=1}^{t} \mathcal{N}(x_i|f_i, Q)\mathcal{N}(f_i|\mathcal{M}_{i-1}, \mathcal{K}_{i-1})$$
$$\mathcal{N}(x_0|\mu_0, \Sigma_0)dx_{0:t}df_{1:t},$$

$\mathfrak{f}_{1:0} = \emptyset$ being applicable.

Equation (17) may be subsequently integrated in the sequence: $x_0 \to \mathfrak{f}_1 \to x_1 \ldots \to \mathfrak{f}_t \to x_t$ starting with $\int \mathcal{N}(\mathfrak{f}_1|_{0}, _{0})\mathbb{R}(x_0|\mu_0, \Sigma_0)^{dx_0}\int \mathcal{N}(\mathfrak{f}_1 \mathcal{M}_0, \mathcal{K}_0)\mathcal{N}(x_0|\mu_0, \Sigma_0)dx_0$ may be approximated with the aid of equation (18) using equation (14).

$$\int \mathcal{N}(f_1 | \mathcal{M}_0, \mathcal{K}_0) \mathcal{N}(x_0 | \mu_0, \Sigma_0) dx_0 \approx \qquad (18)$$

$$\mathcal{N}(f_1 | M(\mu_0, \Sigma_0), V(\mu_0, \Sigma_0)) =: \mathcal{N}(f_1 | M_1, V_1).$$

$\int \mathcal{N}(x_1|f_1,Q)\mathcal{N}(f_1|M_1,V_1)df_1 = \mathcal{N}(x_1|M_1,Q+V_1)$ may subsequently be integrated. The integration of equation (17) may be continued until $M_t$ and $V_t$ are defined:

$$\int \mathcal{N}(f_2 | \mathcal{M}_1, \mathcal{K}_1) \mathcal{N}(x_1 | M_1, Q+V_1) dx_1 \approx$$

$$\mathcal{N}(f_2 | M(M_1, Q+V_1), V(M_1 \cdot Q+V_1)) =: \mathcal{N}(f_2 | M_2, V_2),$$

$$\int \mathcal{N}(x_2 | f_2, Q) \mathcal{N}(f_2 | M_2, V_2) df_2 = \mathcal{N}(x_2 | M_2, Q+V_2).$$

$$\vdots$$

$$\int \mathcal{N}(f_t | \mathcal{M}_{t-1}, \mathcal{K}_{t-1}) \mathcal{N}(x_{t-1} | M_{t-1}, Q+V_{t-1}) dx_{t-1} \approx$$

$$\mathcal{N}(f_t | M(M_{t-1}, Q+V_{t-1}), V(M_{t-1}, Q+V_{t-1})) = \mathcal{N}(f_i | M_i, V_i)$$

$$\int \mathcal{N}(x_t | f_t, Q) \mathcal{N}(f_t | M_t, V_t) df_t = \mathcal{N}(x_t | M_t, Q+V_t).$$

The final integration with respect to $x_t$ may be provided by $$\int \mathcal{N}(y_t | Cx_t+d, R) \mathcal{N}(x_t | M_t, Q+V_t) dx_t =$$

$$\mathcal{N}(y_t | CM_t+d, R+C(Q+V_t)C^T).$$

In this case $p(y_t) \approx \mathcal{N}(y_t|CM_t+d, R+C(Q+V_t)C^T)$ may apply, so that differential entropy $h(y_t)$ in the equation $I(u_t;f_t)=h(y_t)-h(y_t|f_t)$ may be ascertained with the aid of equation (19):

$$h(y_t) \approx \frac{1}{2} \text{logdet}(2\pi e(R + C(Q+V_t)C^T)). \qquad (19)$$

Term $p(y_t|f_t)$ may be ascertained according to:

$$p(y_t | f_t) = \int p(y_t; x_t | f_t) dx_t$$

$$= \int p(y_t | x_t, f_t) p(x_t | f_t) dx_t$$

$$= \int p(y_t | x_t) p(x_t | f_t) dx_t$$

$$= \int \mathcal{N}(y_t | Cx_t+d, R) \mathcal{N}(x_t | f_t, Q) dx_t$$

$$= \mathcal{N}(y_t | Cf_t+d, R+CQC^T).$$

Differential entropy $h(y_t|f_t)$ in equation $I(y_t;f_t)=h(y_t)-h(y_t|f_t)$ may be ascertained with the aid of equation (20):

$$h(y_t | f_t) = \frac{1}{2} \text{logdet}(2\pi e(R + CQC^T)). \qquad (20)$$

An insertion of equations (19) and (20) into present mutual information $I(y_t;f_t)=h(y_t)-h(y_t|f_t)$ results in equation (21):

$$I(y_t; f_t) \approx \frac{1}{2} \text{logdet}(2\pi e(R + C(Q+V_t)C^T)) - \qquad (21)$$

$$\frac{1}{2} \text{logdet}(2\pi e(R + CQC^T))$$

$$= \frac{1}{2} \log\left(\frac{\det(R + C(Q+V_t)C^T)}{\det(R + CQC^T)}\right).$$

As described, present mutual information $I(y_t;f_t)$ may be ascertained (for example, approximated, for example, estimated) according to equation (21) using the nomenclature of equations (1) through (4) and (6)

(2) Entire Mutual Information $I(y_{1:T}, \hat{y}_{t+1}; f_{1:t+1})$

As described, $y_{1:T}, \hat{y}_{t+1}$ may be the shared probability distribution of measured output variables $y_{1:T} = \{y_t\}_{t=1}^T$ and of present output variable normal distribution $\hat{y}_{t+1}$ ascertained for the respective control parameter.

As described, $f_{1:t+1}$ may be the shared probability distribution of known transitional normal distributions $f_{1:T} = \{f_t\}_{t=1}^T$ and of present transitional normal distribution $f_{t+1}$ ascertained for the respective control parameter.

For the purpose of simplification, entire mutual information $I(y_{1:T}, \hat{y}_{t+1}; f_{1:t+1})$ is described below with the aid of $I(y_{1:t}; f_{1:t})$.

According to various specific embodiments, entire mutual information $I(y_{1:t}; f_{1:t})$ may be ascertained using evidence lower bound $\mathcal{L}_t$ provided in equation (11). According to various specific embodiments, a number of S random samples may be taken with $s=1, \ldots, S$.

Entire mutual information $I(y_{1:t}; f_{1:t})$ may be described as $I(y_{1:t}; f_{1:t}) = h(y_{1:t}) - h(y_{1:t}|f_{1:t})$. Differential entropy $h(\bullet)$ may be described for the S random samples with the aid of equation (22):

$$h(\cdot) = \frac{1}{S}\sum_{i=1}^{S} \log\left(\frac{1}{\hat{p}_s(\cdot)}\right), \qquad (22)$$

where $p_s(\bullet)$ is the probability density function (PDF).

For a first probability density function $\hat{p}_s(y_{1:t})$ and a second probability density function $\hat{p}_s(y_{1:t}|f_{1:t})$, entire mutual information $I(y_{1:t}; f_{1:t})$ may be described with the aid of equation (23):

$$I(y_{1:t}; f_{1:t}) \approx \frac{1}{S}\sum_{s=1}^{S}\log\left(\frac{1}{\hat{p}_s(y_{1:t})}\right) - \frac{1}{S}\sum_{s=1}^{S}\log\left(\frac{1}{\hat{p}_s(y_{1:t}|f_{1:t})}\right). \qquad (23)$$

$$\approx \frac{1}{S}\sum_{s=1}^{S}(\log(\hat{p}_s(y_{1:t}|f_{1:t})) - \log(\hat{p}_s(y_{1:t})))$$

The result of equation (23) is that mutual information $i_s$ of the s-th random sample may be described with the aid of equation (24):

$$i_s := \log(\hat{p}_s(y_{1:t}|f_{1:t})) - \log(\hat{p}_s(y_{1:t})), \qquad (24)$$

This results in a limit (in some respects also referred to as a limit value) of mutual information $i_s$ according to equation (25) using evidence lower bound $\mathcal{L}_t$ of the s-th random sample ($\mathcal{L}_{t,s}$) and using $\log(p(y_{1:t})) \geq \mathcal{L}_t$:

$$i_s \leq \log(\hat{p}_s(y_{1:t}|f_{1:t})) - \mathcal{L}_{t,s}, \quad (25)$$

Second probability density function $\hat{p}_s(y_{1:t}|f_{1:t})$ may be ascertained with the aid of equation (26):

$$\hat{p}_s(y_{1:t} \mid f_{1:t}) = \int \hat{p}_s(y_{1:t}, x_{0:t} \mid f_{1:t}) dx_{0:t} \quad (26)$$

$$= \int \hat{p}_s(y_t \mid y_{1:t-1}, x_{0:t}, f_{1:t}) \hat{p}_s(x_t \mid y_{1:t-1}, x_{0:t-1}, f_{1:t})$$

$$\hat{p}_s(y_{1:t-1}, x_{0:t-1} \mid f_{1:t}) dx_{0:t}$$

$$= \int \prod_{i=1}^{t} \hat{p}_s(y_i \mid x_i) \hat{p}_s(x_i \mid f_i) dx_{1:t},.$$

Using the nomenclature of equations (1) through (4), $$\int \prod_{i=1}^{t} \hat{p}_s(y_i|x_i) \hat{p}_s(x_i|f_i) dx_{1:t}$$

of equation (26) may be described according to equation (27):

$$\int \prod_{i=1}^{t} \hat{p}_s(y_i \mid x_i) \hat{p}_s(x_i \mid f_i) dx_{1:t} = \quad (27)$$

$$\int \prod_{i=1}^{t} \mathcal{N}_s(y_i \mid Cx_i + d, R) \mathcal{N}_s(x_i \mid f_i, Q) dx_{1:t} =$$

$$\prod_{i=1}^{t} \left( \int \mathcal{N}_s(y_i \mid Cx_i + d, R) \mathcal{N}_s(x_i \mid f_i, Q) dx_i \right) =$$

$$\prod_{i=1}^{t} \mathcal{N}_s(y_i \mid Cf_i + d, R + CQC^T).,$$

where $\mathcal{N}_s(\bullet)$ is the normal distribution of the s-th random sample.

By using equations (26) and (27) and a recalculation of the products in equation (27) into a sum of the logarithms, mutual information $i_s$ of equation (25) may be ascertained with the aid of equation (28):

$$i_s \leq \sum_{i=1}^{t} \log(\mathcal{N}_s(y_i \mid Cf_i + d, R + CQC^T)) - \mathcal{L}_{t,s}, \quad (28)$$

Entire mutual information $I(y_{1:t}; f_{1:t})$ may thus be ascertained according to equation (29):

$$I(y_{1:t}; f_{1:t}) \approx \frac{1}{S} \sum_{s=1}^{S} i_s. \quad (29)$$

With respect to Gaussian process state space models, it may be assumed that the Markov property is satisfied (that the latent states satisfy the Markov property). In this case, for example, present mutual information $I(\hat{y}_{t+1}; f_{t+1})$ may be used. It is possible, however, that the Markov property is not completely satisfied and that weak dependencies between the latent states are present. In this case, entire mutual information $I(y_{1:t}, \hat{y}_{t+1}; f_{1:t+1})$ may improve the active selection of a control parameter to the extent that an expenditure of time involved in the training is significantly reduced.

With reference to FIG. 3A, control parameter $c_t^*$ of the plurality of control parameters $c \in \boldsymbol{C} \subseteq \mathcal{N}^{d_c}$ having the highest value of mutual information 308 may be selected as new control parameter 310 according to various specific embodiments.

In the case of present mutual information $I(\hat{y}_{t+1}; f_{t+1})$, new control parameter 310, $c_t^*$, may be selected according to equation (30):

$$c_t^* = \underset{c_t \in C}{\operatorname{argmax}} I(\hat{y}_{t+1}; f_{t+1}), \quad (30)$$

present mutual information $I(\hat{y}_{t+1}; f_{t+1})$ being capable of being ascertained using equation (21).

In the case of entire mutual information $I(y_{1:t}, \hat{y}_{t+1}; f_{1:t+1})$, new control parameter 310, $c_t^*$, may be selected according to equation (31):

$$c_t^* = \underset{c_t \in C}{\operatorname{argmax}} I(y_{1:t}, \hat{y}_{t+1}; f_{1:t+1}), \quad (31)$$

entire mutual information $I(y_{1:t}, \hat{y}_{t+1}; f_{1:t+1})$ being capable of being ascertained using equations (28) and (29).

According to various specific embodiments, new control parameter 310, $c_t^*$, may be selected in a different way using ascertained mutual information 308. For example, additional conditions may be taken into account. For example, the control parameter having the second highest value, having the third highest value, etc. may be selected as new control parameter 310, $c_t^*$.

According to various specific embodiments, robotic device 101 may be controlled 312 using new control parameter 310, $c_t^*$. For example, control device 106 may be configured to control 312 robotic device 101 using new control parameter 310, $c_t^*$.

According to various specific embodiments, an output variable 314, $y_{t+1}$, of robotic device 101 assigned to new control parameter 310, $c_t^*$, may be measured. For example, the one or multiple sensors of robotic device system 100 may be configured to measure output variable 314, $y_{t+1}$, assigned to new control parameter 310, $c_t^*$. For example, the one or multiple sensors of robotic device system 100 may be configured to detect data, which describe output variable 314, $y_{t+1}$ assigned to new control parameter 310, $c_t^*$, and computer 110 may be configured to ascertain output variable 314, $y_{t+1}$, assigned to new control parameter 310, $c_t^*$, using the detected data.

According to various specific embodiments, GPSSM 200 may be trained (316) using new control parameter 310, $c_t^*$, and output variable 314, $y_{t+1}$, assigned to new control parameter 310.

According to various specific embodiments, GPSSM 200 may be trained using new control parameter 310, $c_t^*$, and output variable 314, $y_{t+1}$ assigned to new control parameter 310 in such a way that a difference between the measured output variable and a mean value of the output variable normal distribution ascertained for new control parameter 310 may be reduced (for example, minimized). According to various specific embodiments, the predicted output state and measured output variable $y_{t+1}$ may be added to training data $\mathcal{D}\{y_{1:T}, x_{0:T}, f\}$ and GPSSM 200 may be learned for these training data, as described with reference to FIG. 2.

Figure 3B:
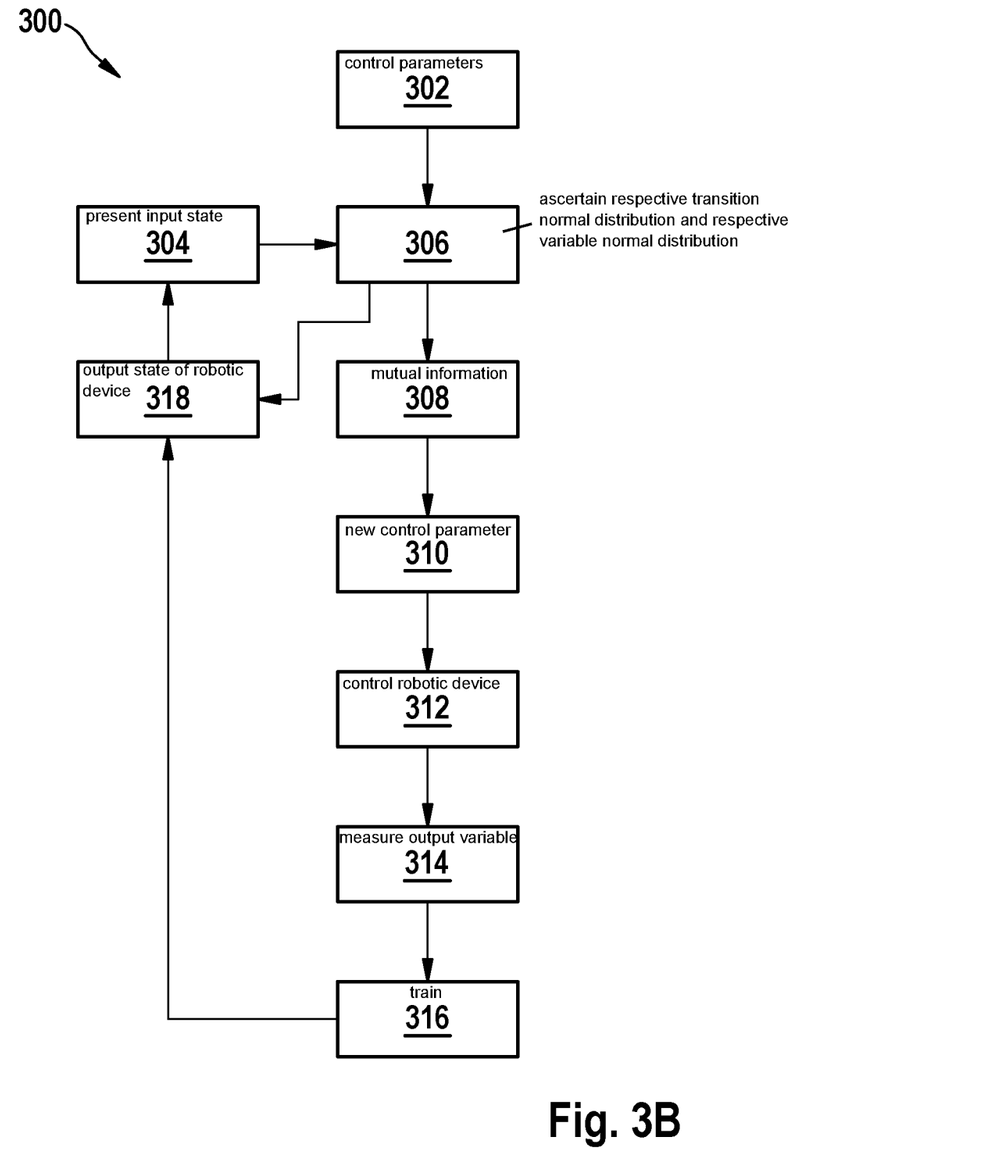

FIG. 3B shows flowchart 300 for training GPSSM 200 according to various specific embodiments. The controlling 312 of robotic device 101 using new control parameter 310 may result in a new latent state of the robotic device. According to various specific embodiments, GPSSM 200 may be iteratively trained. In this case, flowchart 300 may be iteratively carried out for the new state of robotic device 101 as the present state of robotic device 101. According to various specific embodiments, output state 318, $x_{t+1}$, of robotic device 101 predicted in one iteration using transition function, $f_{t+1}$, may be present input state 304, $x_t$, of the following iteration.

According to various specific embodiments, the active learning of a GPSSM may be described with the aid of a piece of mutual information described herein with the aid of algorithm 1:

---
Algorithm 1: Active learning of a GPSSM
---
Input: a number of T measured output variables $y_{1:T}$ and
assigned control parameters $c_{0:T}$
Train the GPSSM
for t = T, T + 1, . . . , T + N do
| 1. Ascertaining new control parameter $c_t^*$ with the aid of
| equation (30) or equation (31).
| 2. Controlling robotic device 101 with the aid of $c_t^*$ and
| measuring output variable $y_{1:T}$.
| 3. Updating the training data
| 4. Learning the GPSSM using the updated training data (see
| description for Figure 2)
| 5. t = t + 1
Output: an optimized GPSSM after N iterations.

--- the optimized GPSSM being learned or having been learned after N iterations for measured output variables $y_{1:T+N}$ and assigned control parameters $c_{0:T+N}$.

Figure 4:
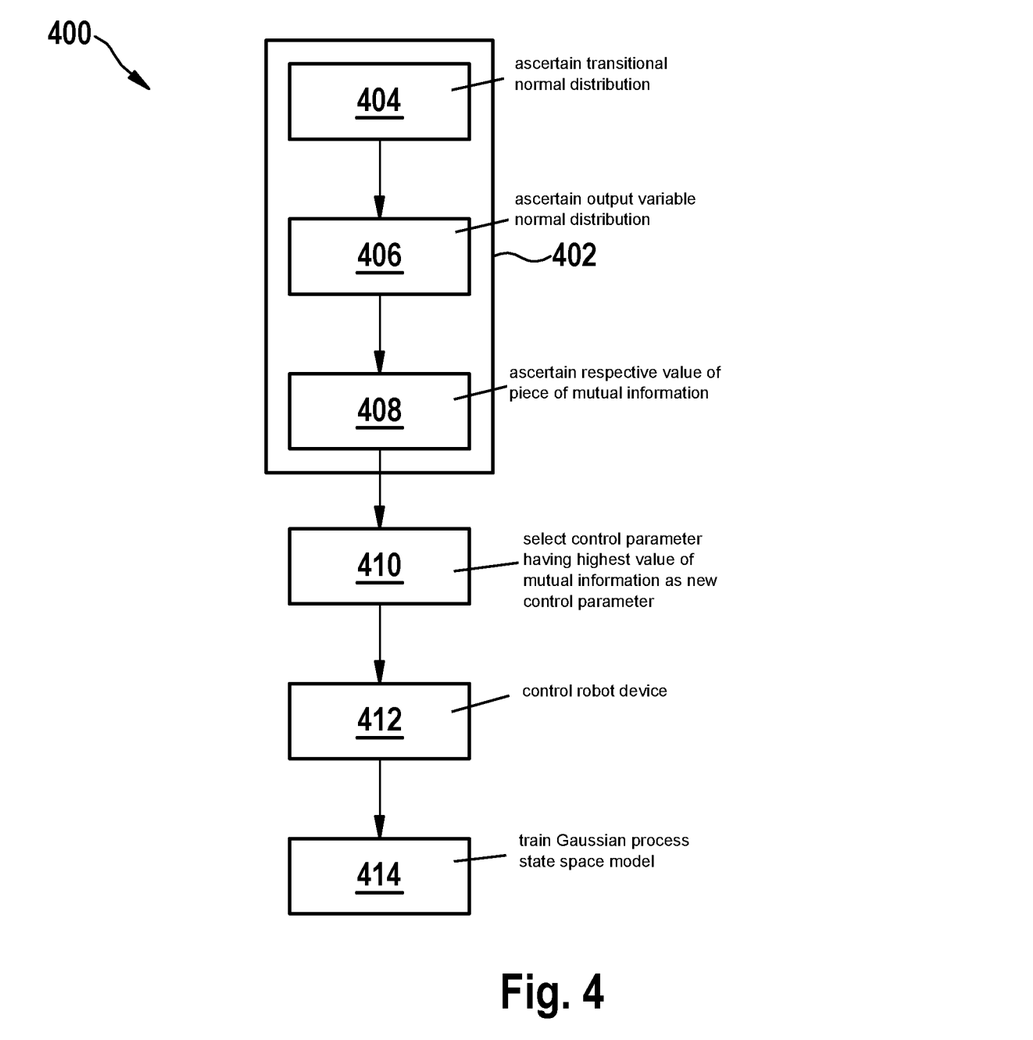
FIG. 4 shows a flowchart of a method for training a Gaussian process state space model of a robotic device according to various specific embodiments of the present invention.

FIG. 4 shows a flowchart 400 of a method for training a Gaussian process state space model of a robotic device according to various specific embodiments. The Gaussian process state space model is able to describe a correlation between selected control parameters of a plurality of control parameters for controlling a robotic device and measured output variables of the robotic device assigned in each case. The Gaussian process state space model may include a transition function and an output variable prediction function. The transition function is able to map an input state of the robotic device and one control parameter of the plurality of control parameters for controlling the robotic device according to a transitional normal distribution assigned to the control parameter and to the input state onto a predicted output state. The output variable prediction function is able to map the predicted output state according to an output variable normal distribution assigned to the predicted output state onto an output variable of the robotic device.

The method may include (in 404) for each control parameter of the plurality of control parameters (in 402) an ascertaining of a transitional normal distribution assigned to the respective control parameter and to a present input state of the robotic device.

The method may include (in 406) for each control parameter of the plurality of control parameters (in 402) an ascertaining of the output variable normal distribution assigned to the respective predicted output state.

The method may include (in 408) for each control parameter of the plurality of control parameters (in 402) an ascertaining of a respective value of a piece of mutual information between the ascertained output variable normal distribution and the ascertained transitional normal distribution.

The method may include (in 410) a selecting of the control parameter having the highest value of the mutual information as a new control parameter.

The method may include (in 412) a controlling of the robotic device using the new control parameter and a measuring of an output variable of the robotic device assigned to the new control parameter.

The method may include (in 414) a training of the Gaussian process state space model using the new control parameter and the assigned measured output variable of the robotic device. The Gaussian process state space model may be trained using the new control parameter and the assigned measured output variable of the robotic device in such a way that a difference between the measured output variable of the robotic device and a mean value of the output variable normal distribution ascertained for the respective new control parameter is reduced (for example, minimized). According to various specific embodiments, the Gaussian process state space model may be learned using a previous training data set at output variables measured for control parameters and the output variable ascertained for the new control parameter. As described, the training data set may be expanded at previously measured output variables by the output variable ascertained for the new control parameter and the Gaussian process state space model may be learned for the expanded training data set.

According to various specific embodiments, a method is provided for training a control model for controlling a robotic device. The method may include for each control parameter of a plurality of control parameters for controlling the robotic device an ascertaining of a respective output variable of a plurality of output variables of the robotic device with the aid of a trained Gaussian process state space model. The trained Gaussian process state space model may, for example, have been trained according to the method described in FIG. 4. The trained Gaussian process state space model may, for example, have been trained according to algorithm 1. The method may include a training of the control model using the plurality of control parameters and the ascertained plurality of output variables. According to various specific embodiments, the control model may be trained using the plurality of control parameters and the ascertained plurality of output variables in such a way that the trained control model outputs a control parameter for a target output variable. In one illustrative example, the trained control model may output a voltage to be applied, with the aid of which a desired target variable of the robotic device is achieved.

What is claimed is:

1. A method for training a Gaussian process state space model, the Gaussian process state space model describing a correlation between selected control parameters of a plurality of control parameters for controlling a robotic device and measured output variables of the robotic device assigned in each case, the Gaussian process state space model including a transition function and an output variable prediction function, the transition function mapping an input state of the robotic device and each control parameter of the plurality of control parameters for controlling the robotic device according to a transitional normal distribution assigned to the control parameter and to the input state onto a predicted output state, and the output variable prediction function mapping the predicted output state according to an output variable normal distribution assigned to the predicted output state onto an output variable of the robotic device, the method comprising:

for each control parameter of the plurality of control parameters:
ascertaining the transitional normal distribution assigned to the respective control parameter and to a present input state of the robotic device,
ascertaining the output variable normal distribution assigned to the respective predicted output state, and
ascertaining a respective value of a piece of mutual information between the ascertained output variable normal distribution and the ascertained transitional normal distribution;
selecting a control parameter of the plurality of control parameters having a highest value of mutual information as a new control parameter;
controlling the robotic device using the new control parameter and measuring an output variable of the robotic device assigned to the new control parameter; and
training the Gaussian process state space model using the new control parameter and the assigned measured output variable of the robotic device in such a way that a difference between the measured output variable of the robotic device and a mean value of the output variable normal distribution ascertained for the new control parameter is reduced.

2. The method as recited in claim 1, wherein the controlling of the robotic device using the new control parameter results in a new state of the robotic device, and the method is iteratively carried out for the new state of the robotic device as a present state of the robotic device in each case, the output state predicted for the respective new control parameter being the present input state of the robotic device of the following iteration.

3. The method as recited in claim 1, wherein the transition function maps the input state of the robotic device and each control parameter of the plurality of control parameters according to the control parameter and to the transitional normal distribution assigned to the input state onto a predicted intermediate state; and the transition function maps the predicted intermediate state onto the predicted output state using a state noise.

4. The method as recited in claim 1, wherein:
each measured output variable of the robotic device is assigned a respective transitional normal distribution ascertained using the transition function and a respective output variable normal distribution ascertained using the output variable prediction function; and
the mutual information between the ascertained output variable normal distribution and the ascertained transitional normal distribution of a respective control parameter is a piece of mutual information between:
a shared probability distribution of the output variables, which include the output variable normal distributions assigned to the measured output variables and the output variable normal distribution ascertained for the respective control parameter; and
a shared probability distribution of the transitional normal distributions, which include the transitional normal distributions assigned to the measured output variables and the transitional normal distribution ascertained for the respective control parameter.

5. The method as recited in claim 4, wherein the ascertaining of the value of the mutual information between the output variable normal distributions assigned to the measured output variables as well as the output variable normal distribution ascertained for the respective control parameter, and the transitional normal distributions assigned to the measured output variables and the transitional normal distribution ascertained for the respective control parameter includes:
for each sample value of a plurality of sample values:
for each measured output variable of the robotic device, ascertaining a respective limit value with the aid of a difference of a logarithm of a probability density function assigned to all measured output variables and an evidence lower bound ascertained for the respective measured output variable, and
adding up the limit values ascertained for all measured output variables;
ascertaining a mean value of the added up limit values of all sample values of the plurality of sample values as the value of the mutual information.

6. The method as recited in claim 1, wherein the present input state of the robotic device is a latent state.

7. The method as recited in claim 1, wherein the training of the Gaussian process state space model using the new control parameter and the assigned measured output variable of the robotic device includes a training of the Gaussian process state space model using a variation inference method using the new control parameter and the assigned measured output variable of the robotic device.

8. A robotic device comprising a computer configured to train a Gaussian process state space model, the Gaussian process state space model describing a correlation between selected control parameters of a plurality of control parameters for controlling the robotic device and measured output variables of the robotic device assigned in each case, the Gaussian process state space model including a transition function and an output variable prediction function, the transition function mapping an input state of the robotic device and each control parameter of the plurality of control parameters for controlling the robotic device according to a transitional normal distribution assigned to the control parameter and to the input state onto a predicted output state, and the output variable prediction function mapping the predicted output state according to an output variable normal distribution assigned to the predicted output state onto an output variable of the robotic device, the computer being configured to train the Gaussian process state space model by:

for each control parameter of the plurality of control parameters:
ascertaining the transitional normal distribution assigned to the respective control parameter and to a present input state of the robotic device,
ascertaining the output variable normal distribution assigned to the respective predicted output state, and
ascertaining a respective value of a piece of mutual information between the ascertained output variable normal distribution and the ascertained transitional normal distribution;
selecting a control parameter of the plurality of control parameters having a highest value of mutual information as a new control parameter;
controlling the robotic device using the new control parameter and measuring an output variable of the robotic device assigned to the new control parameter; and training the Gaussian process state space model using the new control parameter and the assigned measured output variable of the robotic device in such a way that a difference between the measured output variable of the robotic device and a mean value of the output variable normal distribution ascertained for the new control parameter is reduced.

9. A method for training a control model, configured to control a robotic device, the method including:
for each control parameter of a plurality of control parameters for controlling the robotic device, ascertaining a respective output variable of a plurality of output variables of the robotic device using a trained Gaussian process state space model, the Gaussian process state space model describing a correlation between the control parameters of the plurality of control parameters for controlling a robotic device and measured output variables of the robotic device assigned in each case, the Gaussian process state space model including a transition function and an output variable prediction function, the transition function mapping an input state of the robotic device and each control parameter of the plurality of control parameters for controlling the robotic device according to a transitional normal distribution assigned to the control parameter and to the input state onto a predicted output state, and the output variable prediction function mapping the predicted output state according to an output variable normal distribution assigned to the predicted output state onto an output variable of the robotic device, the training of the Gaussian process state space model including:
for each control parameter of the plurality of control parameters:
ascertaining the transitional normal distribution assigned to the respective control parameter and to a present input state of the robotic device,
ascertaining the output variable normal distribution assigned to the respective predicted output state, and
ascertaining a respective value of a piece of mutual information between the ascertained output variable normal distribution and the ascertained transitional normal distribution;
selecting a control parameter of the plurality of control parameters having a highest value of mutual information as a new control parameter;
controlling the robotic device using the new control parameter and measuring an output variable of the robotic device assigned to the new control parameter; and
training the Gaussian process state space model using the new control parameter and the assigned measured output variable of the robotic device in such a way that a difference between the measured output variable of the robotic device and a mean value of the output variable normal distribution ascertained for the new control parameter is reduced; and
training the control model using the plurality of control parameters and the ascertained plurality of output variables in such a way that the trained control model outputs a control parameter for a target output variable.

10. A robotic device, comprising:
a memory unit, which is configured to store a control model trained by:
for each control parameter of a plurality of control parameters for controlling the robotic device, ascertaining a respective output variable of a plurality of output variables of the robotic device using a trained Gaussian process state space model, the Gaussian process state space model describing a correlation between the control parameters of the plurality of control parameters for controlling a robotic device and measured output variables of the robotic device assigned in each case, the Gaussian process state space model including a transition function and an output variable prediction function, the transition function mapping an input state of the robotic device and each control parameter of the plurality of control parameters for controlling the robotic device according to a transitional normal distribution assigned to the control parameter and to the input state onto a predicted output state, and the output variable prediction function mapping the predicted output state according to an output variable normal distribution assigned to the predicted output state onto an output variable of the robotic device,
a control unit that includes a computer configured to train the Gaussian process state space model by:
for each control parameter of the plurality of control parameters:
ascertaining the transitional normal distribution assigned to the respective control parameter and to a present input state of the robotic device,
ascertaining the output variable normal distribution assigned to the respective predicted output state, and
ascertaining a respective value of a piece of mutual information between the ascertained output variable normal distribution and the ascertained transitional normal distribution;
selecting a control parameter of the plurality of control parameters having a highest value of mutual information as a new control parameter;
controlling the robotic device using the new control parameter and measuring an output variable of the robotic device assigned to the new control parameter; and
training the Gaussian process state space model using the new control parameter and the assigned measured output variable of the robotic device in such a way that a difference between the measured output variable of the robotic device and a mean value of the output variable normal distribution ascertained for the new control parameter is reduced; and
training the control model using the plurality of control parameters and the ascertained plurality of output variables in such a way that the trained control model outputs a control parameter for a target output variable;
the control unit being configured to control the robotic device according to the trained control model.

11. A non-transitory computer-readable medium on which are stored instructions for training a Gaussian process state space model, the Gaussian process state space model describing a correlation between selected control parameters of a plurality of control parameters for controlling a robotic device and measured output variables of the robotic device assigned in each case, the Gaussian process state space model including a transition function and an output variable prediction function, the transition function mapping an input state of the robotic device and each control parameter of the plurality of control parameters for controlling the robotic device according to a transitional normal distribution assigned to the control parameter and to the input state onto a predicted output state, and the output variable prediction function mapping the predicted output state according to an output variable normal distribution assigned to the predicted output state onto an output variable of the robotic device, the instruction, when executed by a computer, causing the computer to perform the following steps:
  for each control parameter of the plurality of control parameters:
    ascertaining the transitional normal distribution assigned to the respective control parameter and to a present input state of the robotic device,
    ascertaining the output variable normal distribution assigned to the respective predicted output state, and
    ascertaining a respective value of a piece of mutual information between the ascertained output variable normal distribution and the ascertained transitional normal distribution;
  selecting a control parameter of the plurality of control parameters having a highest value of mutual information as a new control parameter;
  controlling the robotic device using the new control parameter and measuring an output variable of the robotic device assigned to the new control parameter; and
  training the Gaussian process state space model using the new control parameter and the assigned measured output variable of the robotic device in such a way that a difference between the measured output variable of the robotic device and a mean value of the output variable normal distribution ascertained for the new control parameter is reduced.

* * * * *